United States Patent
Suzuki et al.

(10) Patent No.: US 9,758,710 B2
(45) Date of Patent: Sep. 12, 2017

(54) HEAT STORAGE MATERIAL COMPOSITION, HEAT STORAGE DEVICE, AND HEAT STORAGE METHOD

(71) Applicant: Panasonic Corporation, Osaka (JP)

(72) Inventors: Motohiro Suzuki, Osaka (JP); Hironobu Machida, Nara (JP); Shinsuke Takeguchi, Osaka (JP); Kentaro Shii, Osaka (JP); Izumi Hirasawa, Tokyo (JP); So Morioka, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 25 days.

(21) Appl. No.: 14/857,673

(22) Filed: Sep. 17, 2015

(65) Prior Publication Data

US 2016/0090520 A1    Mar. 31, 2016

(30) Foreign Application Priority Data

Sep. 29, 2014 (JP) ................................ 2014-198213
Nov. 27, 2014 (JP) ................................ 2014-239843

(51) Int. Cl.
   *C09K 5/06* (2006.01)
   *F28D 20/00* (2006.01)

(52) U.S. Cl.
   CPC .......... *C09K 5/063* (2013.01); *F28D 20/0034* (2013.01)

(58) Field of Classification Search
   CPC .............................. C09K 5/063; F28D 20/0034
   USPC ........................................ 252/76, 74; 165/10
   See application file for complete search history.

(56) References Cited

U.S. PATENT DOCUMENTS

| 4,295,517 | A | * | 10/1981 | Guex | ........................ | A61F 7/03 126/263.03 |
| 5,785,885 | A | * | 7/1998 | Kakiuchi | ................ | C09K 5/066 252/70 |
| 6,447,692 | B1 | * | 9/2002 | Momoda | ................ | C09K 5/063 16/10 |
| 7,406,998 | B2 | * | 8/2008 | Kudo | ...................... | F28D 20/02 165/10 |
| 7,654,306 | B2 | * | 2/2010 | Takahashi | ............. | F28D 20/025 165/10 |
| 7,735,461 | B2 | * | 6/2010 | Vetrovec | .................. | F01P 11/20 123/41.01 |
| 8,091,613 | B2 | * | 1/2012 | Bank | ...................... | C09K 5/063 165/10 |
| 8,171,984 | B2 | * | 5/2012 | Christ | .................... | C09K 5/063 165/10 |
| 8,715,523 | B2 | * | 5/2014 | Houjou | ................. | C07C 251/24 252/518.1 |
| 2008/0230203 | A1 | * | 9/2008 | Christ | .................... | C09K 5/063 165/10 |
| 2009/0211726 | A1 | * | 8/2009 | Bank | ...................... | C09K 5/063 165/10 |
| 2012/0216981 | A1 | * | 8/2012 | Bank | ...................... | C09K 5/063 165/10 |
| 2015/0090422 | A1 | * | 4/2015 | Suzuki | .................... | C09K 5/10 165/10 |

FOREIGN PATENT DOCUMENTS

| EP |      754744     | 1/1997 |            |
| JP | EP 0722997 A2 * | 7/1996 | ............. C09K 5/063 |
| JP |    8-245953     | 9/1996 |            |
| JP |    9-249875     | 9/1997 |            |
| JP | EP 0754744 B1 * | 8/2000 | ............. C09K 5/063 |
| JP |   2004-205151   | 7/2004 |            |
| JP |   2011-153206   | 8/2011 |            |

OTHER PUBLICATIONS

The Extended European Search Report dated Feb. 24, 2016 for the related European Patent Application No. 15186600.1.

* cited by examiner

*Primary Examiner* — Douglas McGinty
(74) *Attorney, Agent, or Firm* — McDermott Will & Emery LLP

(57) ABSTRACT

A heat storage material composition contains a sugar alcohol and a stabilizer that allows the sugar alcohol to maintain a liquid state and a supercooled state. The stabilizer is one selected from (i) a salt that has a solubility of 9 g or more in 100 mL of 20° C. water and gives a monovalent anion, (ii) a polymer prepared by using the salt as a monomer, and (iii) a polymer having a molecular weight of 7,000 or more and 4,000,000 or less prepared by using, as a monomer, an alcohol having a solubility of 9 g or more in 100 mL of 20° C. water.

10 Claims, 8 Drawing Sheets

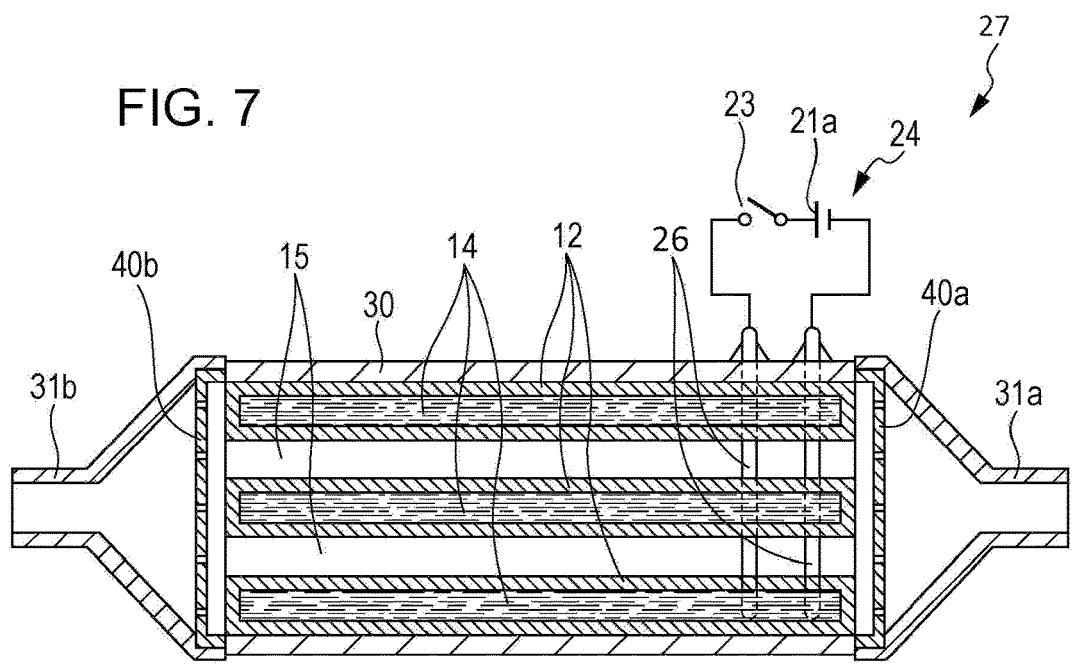
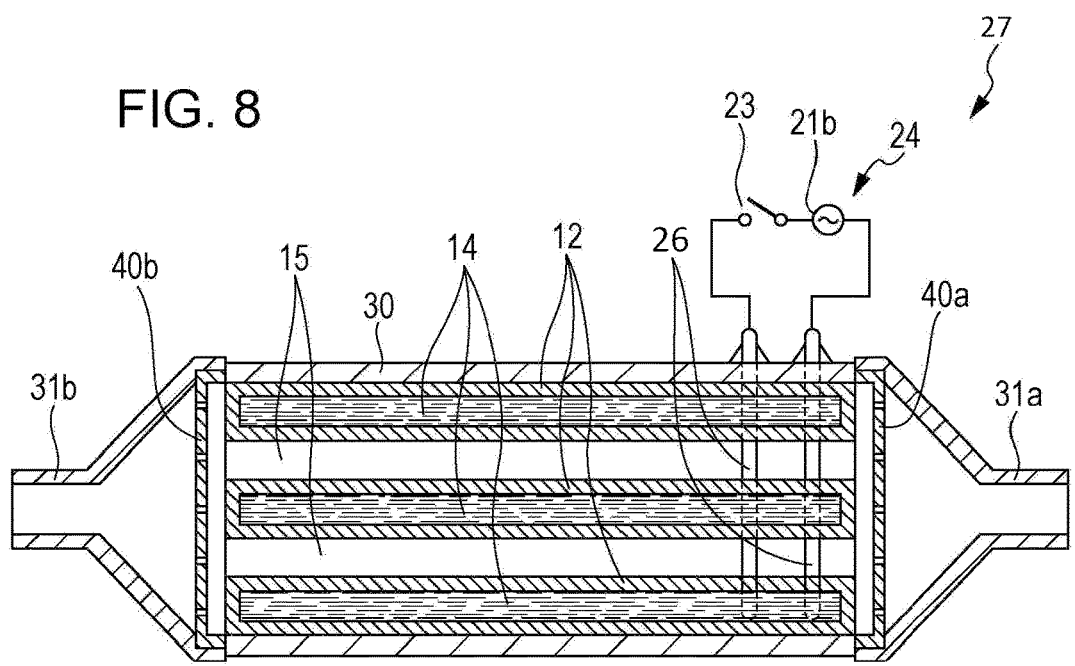

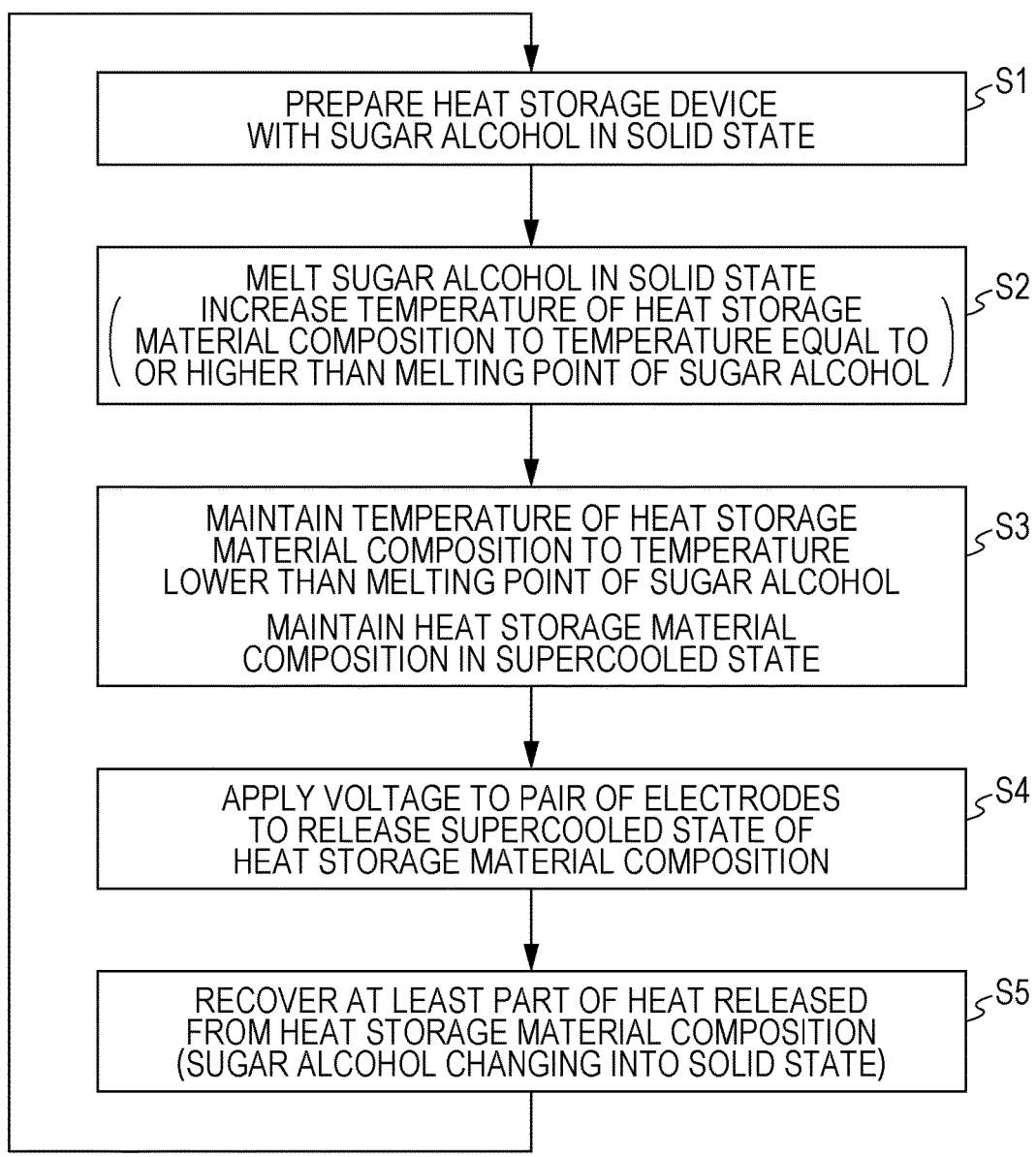

HEAT STORAGE MATERIAL COMPOSITION, HEAT STORAGE DEVICE, AND HEAT STORAGE METHOD

BACKGROUND

1. Technical Field

This disclosure relates to a heat storage material composition, a heat storage device that uses the heat storage material composition, and a heat storage method that uses the heat storage material composition.

2. Description of the Related Art

In using thermal energy in domestic and industrial applications, excess amounts of energy is sometimes generated relative to the amount of thermal energy needed. Moreover, the time thermal energy is generated may not always be the time thermal energy is needed. In order to make effective use of thermal energy generated, thermal energy has been temporarily stored by using heat storage materials.

Sensible heat storage materials and latent heat storage materials are known as heat storage materials. Latent heat storage materials are a type of heat storage materials that utilize phase changes such as melting of matters. Latent heat storage materials have a heat storage density higher than that of sensible heat storage materials. Latent heat storage materials have an advantage in that thermal energy can be stably retrieved from the latent heat storage materials since the temperature at the time of phase change is constant. In the case where heat is stored by using latent heat storage materials, the latent heat storage materials are heated and enter a liquid state. Then the latent heat storage materials are kept warm so as to maintain the liquid state. The heat stored in the latent heat storage materials can be retrieved at a desirable timing by crystallizing (solidifying) the latent heat storage materials.

Sugar alcohols have relatively high latent heat of melting and are known to be substances that can efficiently store heat with a relatively small volume. Sugar alcohols are also safe substances that do not exhibit toxicity. Although sugar alcohols melt at a temperature (melting point) specific to a substance, they are known to remain un-solidified and remain in a fluidized state, i.e., a supercooled state, at a temperature lower than the melting point once they are melted. Accordingly, studies have been focused on heat storage by keeping sugar-alcohol-containing latent heat storage materials in a supercooled state after they are heated to be in a liquid state. In such a case, the heat stored in the latent heat storage materials can be retrieved by releasing the supercooled state of the sugar-alcohol-containing latent heat storage materials.

Japanese Unexamined Patent Application Publication No. 2011-153206 describes a heat storage material composition containing a sugar alcohol and a polyether-modified silicone. Incorporation of a polyether-modified silicone into a heat storage material composition prevents sugar alcohol molecules from bonding to each other and suppresses crystallization (solidification) of the sugar alcohol. As a result, the crystallization onset temperature of the heat storage material composition is decreased and supercooling can be accelerated. For example, the crystallization onset temperature of the heat storage material composition of Example 1 in Japanese Unexamined Patent Application Publication No. 2011-153206 is 48.0° C.

SUMMARY

One non-limiting and exemplary embodiment provides a novel heat storage material composition that can stably keep a supercooled state at room temperature or a temperature near room temperature.

In one general aspect, the techniques disclosed here feature a heat storage material composition that contains a sugar alcohol and a stabilizer that allows the sugar alcohol to maintain a liquid state and a supercooled state, the stabilizer being one selected from (i) a salt that has a solubility of 9 g or more in 100 mL of 20° C. water and gives a monovalent anion, (ii) a polymer prepared by using the salt as a monomer, and (iii) a polymer having a molecular weight of 7,000 or more and 4,000,000 or less prepared by using, as a monomer, an alcohol having a solubility of 9 g or more in 100 mL of 20° C. water.

The present disclosure provides a heat storage material composition that can stably maintain a supercooled state at room temperature or a temperature near room temperature.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a cross-sectional view of a heat storage device according to an embodiment of the present disclosure;

FIG. 8 is a cross-sectional view of a heat storage device according to an embodiment of the present disclosure; and FIG. 9 is a flowchart illustrating a heat storage method of the present disclosure.

DETAILED DESCRIPTION

Figure 1:
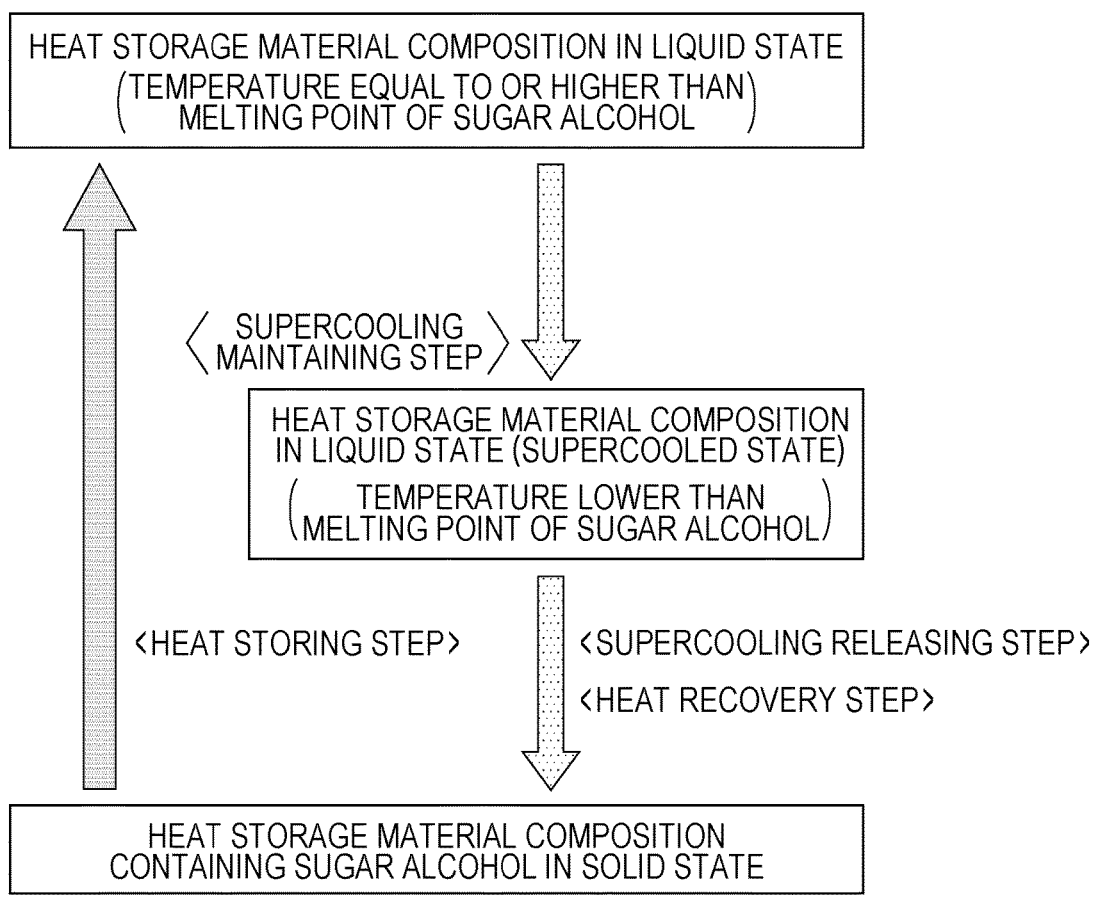
FIG. 1 is a schematic diagram illustrating changes in the state of a heat storage material composition in a heat storage method of the present disclosure.

In a heat storage system that uses a heat storage material composition containing a sugar alcohol, it is preferable to maintain the heat storage material composition in a supercooled state until the time when heat is required. However, for example, in the case where heat is stored by using waste heat of an automobile internal combustion engine or waste heat of a boiler as a heat source, there is a possibility the temperature of the heat storage material composition will drop to room temperature or a temperature near room temperature during the period of heat storage (period during which the heat storage material composition is in a supercooled state). As a result, there is a possibility that the sugar alcohol will crystallize (solidify) before the time when heat is required. Accordingly, a heat storage material composition that can stably maintain a supercooled state at room temperature or a temperature near room temperature has been pursued.

The inventors have studied to find a novel heat storage material composition that contains a sugar alcohol but is different from one described in Japanese Unexamined Patent Application Publication No. 2011-153206. The inventors have found that when a particular stabilizer is contained in a heat storage material composition, crystallization (solidification) of the sugar alcohol is suppressed by the interaction between the sugar alcohol and the stabilizer and the supercooled state can be maintained at room temperature or a temperature near room temperature (for example, 25° C. to 60° C.). The inventors have conducted further studies based on this finding and found the heat storage material composition of the present disclosure.

A first aspect of the present disclosure provides a heat storage material composition that includes
a sugar alcohol; and
a stabilizer that allows the sugar alcohol to maintain a liquid state and a supercooled state, the stabilizer being one selected from
  (i) a salt that has a solubility of 9 g or more in 100 mL of 20° C. water and gives a monovalent anion,
  (ii) a polymer prepared by using the salt as a monomer, and
  (iii) a polymer having a molecular weight of 7,000 or more and 4,000,000 or less prepared by using, as a monomer, an alcohol having a solubility of 9 g or more in 100 mL of 20° C. water.

According to the first aspect, crystallization (solidification) of the sugar alcohol is suppressed by the interaction between the sugar alcohol and the stabilizer and thus the heat storage material composition can stably maintain a supercooled state at room temperature or a temperature near room temperature.

According to a second aspect, for example, the salt in the heat storage material composition of the first aspect may be a carboxylate or the polymer (ii) in the heat storage material composition of the first aspect may be a polycarboxylate.

According to a third aspect, for example, the salt in the heat storage material composition of the second aspect may be sodium acetate, ammonium acetate, potassium acetate, or sodium acrylate.

According to a fourth aspect, for example, the polymer (ii) in the heat storage material composition of the second aspect may be sodium polyacrylate.

According to a fifth aspect, for example, the salt in the heat storage material composition of the first aspect may be a chloride According to a sixth aspect, for example, the chloride in the heat storage material composition of the fifth aspect may be sodium chloride or calcium chloride.

According to a seventh aspect, for example, the salt in the heat storage material composition of the first aspect may be a hydroxide.

According to an eighth aspect, for example, the hydroxide in the heat storage material composition of the seventh aspect may be sodium hydroxide.

According to a ninth aspect, for example, the salt in the heat storage material composition of the first aspect may be a nitrate.

According to a tenth aspect, for example, the nitrate contained in the heat storage material composition of the ninth aspect may be sodium nitrate or silver nitrate.

According to an eleventh aspect, for example, the salt contained in the heat storage material composition of the first aspect may be a hydrogencarbonate.

According to a twelfth aspect, for example, the hydrogencarbonate contained in the heat storage material composition of the eleventh aspect may be sodium hydrogencarbonate.

According to a thirteenth aspect, for example, the salt contained in the heat storage material composition of the first aspect may be a benzoate.

According to a fourteenth aspect, for example, the benzoate contained in the heat storage material composition of the thirteenth aspect may be sodium benzoate or potassium benzoate.

According to a fifteenth aspect, for example, the polymer (iii) contained in the heat storage material composition of the first aspect may be polyethylene glycol.

According to a sixteenth aspect, for example, the sugar alcohol contained in any one of the heat storage material compositions of the first to fifteenth aspects may be erythritol.

A seventeenth aspect provides a heat storage device that includes
the heat storage material composition according to any one of the first to sixteenth aspects; and
a pair of electrodes arranged to be in contact with the heat storage material composition,
in which at least one of the pair of electrodes contains silver or a silver compound or the heat storage material composition contains a silver ion when in a liquid state, and
when the heat storage material composition is in a liquid state and in a supercooled state, voltage is applied between the pair of electrodes so as to release the supercooled state of the heat storage material composition.

The technique of releasing supercooling of a heat storage material composition by applying voltage to a pair of electrodes is effective for heat storage material compositions that contain sodium acetate trihydrate having an ion bond, as described in Japanese Examined Patent Application Publication No. 64-8260. However, presumably, a supercooled state of a heat storage material composition that contains only a sugar alcohol cannot be easily released by using this technology. This is because a sugar alcohol has a high electrical insulating property and has a very low electrical conductivity and thus it is not easy to apply energy sufficient for releasing the supercooled state of the sugar alcohol by applying voltage between the pair of electrodes. However, according to a heat storage device of the fifteenth aspect, at least one of the pair of electrodes contains silver or a silver compound or the heat storage material composition contains a silver ion when in a liquid state. Accordingly, the supercooled state of the heat storage material composition containing the sugar alcohol can be easily released by applying voltage between the pair of electrodes.

An eighteenth aspect provides a heat storage method that includes
increasing a temperature of the heat storage material composition according to any one of the first to sixteenth aspects to a temperature equal to or higher than a melting point of the sugar alcohol so as to melt the sugar alcohol in a solid state;
maintaining the temperature of the heat storage material composition to a temperature lower than the melting point of the sugar alcohol and maintaining the heat storage material composition in a supercooled state;

solidifying the sugar alcohol; and recovering at least part of heat released from the heat storage material composition as a result of solidification of the sugar alcohol.

First Embodiment

Embodiments of the present disclosure will now be described with reference to the drawings. The description below merely concerns illustrative examples of the present disclosure and does not limit the present disclosure.

Heat Storage Material Composition

A heat storage material composition according to the disclosure contains a sugar alcohol and a stabilizer. The stabilizer is, for example, a salt which gives a monovalent anion and has a solubility of 9 g or more in 100 mL of 20° C. water or a polymer prepared by using this salt as a monomer. When the stabilizer is such a salt or such a polymer, interaction between the sugar alcohol and the stabilizer suppresses crystallization (solidification) of the sugar alcohol. As a result, the heat storage material composition can be stability maintain a supercooled state at room temperature or a temperature near room temperature.

In the case where the stabilizer is a salt, any salt that is monovalent anion and has a solubility of 9 g or more in 100 mL of 20° C. water can be used. Examples of the salt include carboxylates, chlorides, hydroxides, nitrates, hydrogencarbonates, and benzoates. Examples of the carboxylates used as the stabilizer include sodium acetate, ammonium acetate, potassium acetate, and sodium acrylate. The solubilities of sodium acetate, ammonium acetate, potassium acetate, and sodium acrylate in 100 mL of 20° C. water are, respectively, 32.0 g, 37.0 g, 256 g, and 30 g or more. Examples of the chloride serving as a stabilizer include sodium chloride and calcium chloride. The solubilities of sodium chloride and calcium chloride in 100 mL of 20° C. water are, respectively, 36.0 g and 74.7 g. An example of the hydroxide serving as a stabilizer is sodium hydroxide. The solubility of sodium hydroxide in 100 mL of 20° C. water is 109.4 g. Examples of the nitrate serving as a stabilizer include sodium nitrate and silver nitrate. The solubilities of sodium nitrate and silver nitrate in 100 mL of 20° C. water are, respectively, 91.9 g and 217.2 g. An example of the hydrogencarbonate serving as a stabilizer is sodium hydrogencarbonate. The solubility of sodium hydrogencarbonate in 100 mL of 20° C. water is 9.6 g. Examples of the benzoate serving as a stabilizer include sodium benzoate and potassium benzoate. The solubilities of sodium benzoate and potassium benzoate in 100 mL of 20° C. water are, respectively, 62.7 g and 70.7 g.

In the case where the stabilizer is a polymer, the polymer is, for example, a polycarboxylate prepared by using a carboxylate as a monomer. An example of the polycarboxylate serving as a stabilizer is sodium polyacrylate. The molecular weight of the sodium polyacrylate may be any and is, for example, 2,700 to 70,000. For the purposes of this specification, the term "molecular weight" means a "viscosity-average molecular weight".

Alternatively, the stabilizer may be a polymer having a molecular weight of 7,000 or more prepared by using, as a monomer, an alcohol having a solubility of 9 g or more in 100 mL of 20° C. water. In this case, the polymer serving as a stabilizer is, for example, polyethylene glycol. The molecular weight of the polymer is, for example, 7,000 to 4,000,000. Ethylene glycol is infinitely miscible in 100 mL of 20° C. water.

The heat storage material composition may contain any one of the stabilizers described above or any two or more of the stabilizers described above.

The sugar alcohol contained in the heat storage material composition of the present disclosure may be any. Examples thereof include erythritol, xylitol, arabitol, sorbitol, mannitol, threitol, galactitol, and pentaerythritol. These may be used alone or in combination of two or more. In the case where heat is stored by using waste heat of automobile internal combustion engines or waste heat of boilers as a heat source, the melting point of the sugar alcohol contained in the heat storage material composition is preferably 80° C. to 200° C. Considering the properties such as stability, safety, low moisture absorption, and high latent heat quantity, the sugar alcohol contained in the heat storage material composition of the present disclosure is preferably erythritol.

The heat storage material composition preferably contains as much sugar alcohols as it can so that the heat storage material composition can store more heat. In other words, the mass of the stabilizer contained in the heat storage material composition is preferably small. In this view, the ratio (Ws/Wa) of the mass Ws of the stabilizer contained in the heat storage material composition to the mass Wa of the sugar alcohol contained in the heat storage material composition is, for example, 0.3 or less, preferably 0.2 or less, more preferably 0.1 or less, and yet more preferably 0.05 or less. The lower limit of the Ws/Wa value may be any value as long as the heat storage material composition can maintain a supercooled state at room temperature or a temperature near room temperature.

The heat storage material composition of the present disclosure may contain components other than the sugar alcohol and the stabilizer. The heat storage material composition of the present disclosure may contain, for example, a viscosity adjustor. Alternatively, the heat storage material composition of the present disclosure may be solely composed of a sugar alcohol and a stabilizer.

The heat storage material composition can be prepared by mixing powder of a sugar alcohol and powder of a stabilizer. The heat storage material composition may also be prepared by adding a stabilizer to a sugar alcohol that has entered a liquid state by being heated to a temperature equal to or higher than the melting point of the sugar alcohol and stirring the resulting mixture by using a stirrer or the like.

Heat Storage Method

Figure 2:
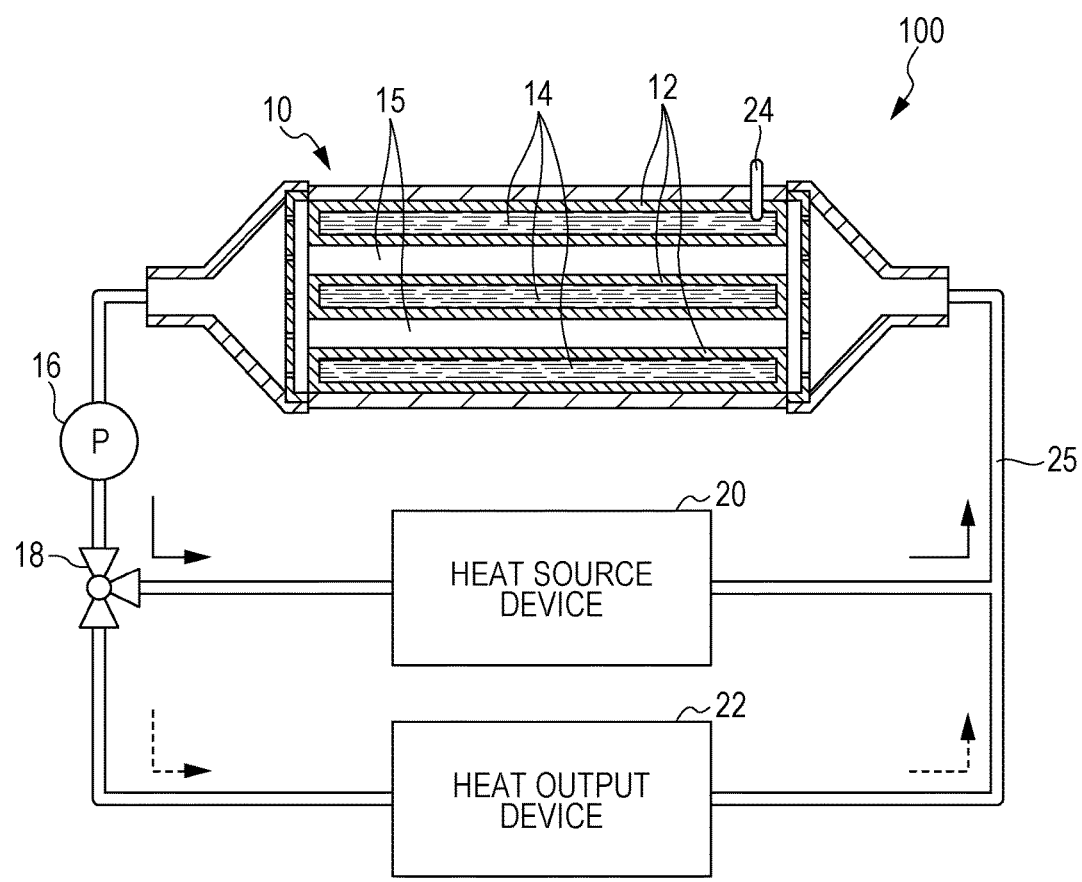
FIG. 2 is a diagram illustrating a heat storage system used to implement the heat storage method of the present disclosure.

Next, an example of a heat storage method that uses the heat storage material composition described above is described. The heat storage method includes a heat storing step, a supercooling maintaining step, a supercooling releasing step, and a heat recovery step. The state of the heat storage material composition changes as indicated in FIG. 1 through these steps. The heat storage method is, for example, implemented by using a heat storage system 100 illustrated in FIG. 2.

The heat storage system 100 includes a heat storage device 10, a pump 16, a three-way valve 18, a heat source device 20, a heat output device 22, and a channel 25. The channel 25 is formed so that a heat medium is supplied from the heat source device 20 to the heat storage device 10 and returns from the heat storage device 10 to the heat source device 20. The channel 25 is also formed so that a heat medium is supplied from the heat output device 22 to the heat storage device 10 and returns from the heat storage device 10 to the heat output device 22. The pump 16 and the three-way valve 18 are provided on the channel 25. The pump 16 is operated to circulate the heat medium between the heat source device 20 and the heat storage device 10 or circulate the heat medium between the heat output device 22 and the heat storage device 10. Switching between the state in which the heat medium circulates between the heat source device 20 and the heat storage device 10 and the state in which the heat medium circulates between the heat output device 22 and the heat storage device 10 is conducted by controlling the three-way valve 18.

The heat storage device 10 includes containers 12, a heat storage material composition 14, an inner channel 15, and a supercooling releaser 24. The heat storage material composition 14 is the heat storage material composition of the present disclosure described above. The heat storage material composition 14 is contained in the containers 12. The containers 12 are, for example, air-tight containers having heat conductivity. The inner channel 15 is a channel through which a heat medium supplied to the interior of the heat storage device 10 from the heat source device 20 or the heat output device 22 flows. At least part of the inner channel 15 is formed by outer peripheral surfaces of the containers 12. That is, the heat medium flows in the inner channel 15 while making contact with the outer peripheral surfaces of the containers 12. As a result, heat is exchanged between the heat medium flowing in the inner channel 15 and the heat storage material composition 14 inside the containers 12. The supercooling releaser 24 may be any as long as the supercooled state of the sugar alcohol contained in the heat storage material composition 14 can be released and any known supercooling releaser can be used. For example, the supercooling releaser 24 is a cooler that locally cools the heat storage material composition 14, a discharge device, or a supersonic wave generator.

The heat storing step involves increasing the temperature of the heat storage material composition 14 contained in the containers 12 to a temperature (for example, 130°) equal to or higher than the melting point of the sugar alcohol contained in the heat storage material composition 14 by causing the containers 12 to receive heat from the flow of the heat medium so as to melt the sugar alcohol in a solid state contained in the heat storage material composition 14. As illustrated in FIG. 1, the heat storage material composition 14 before the heat storing step is in a solid-liquid coexisting state in which a sugar alcohol in a solid state and a solution of a stabilizer coexist. In the heat storing step, the sugar alcohol in a solid state is melted and the heat storage material composition 14 enters a liquid state (a mixture of the sugar alcohol in a liquid state and the solution of the stabilizer). In such a case, the three-way valve 18 is controlled so that the heat medium is supplied from the heat source device 20 to the heat storage device 10 and returns from the heat storage device 10 to the heat source device 20. As indicated by a solid arrow in FIG. 2, the pump 16 is operated so that the heat medium circulates between the heat source device 20 and the heat storage device 10. During this process, the heat medium flows in the inner channel 15 in the heat storage device 10 and the containers 12 receive heat from the flow of the heat medium. The heat medium has a temperature equal to or higher than the melting point of the sugar alcohol contained in the heat storage material composition 14. The heat medium is, for example, oil. The heat medium is heated in the heat source device 20 by, for example, waste heat of an automobile internal combustion engine or waste heat of a boiler. In this manner, the temperature of the heat storage material composition 14 can be increased to a temperature equal to or higher than the melting point of the sugar alcohol contained in the heat storage material composition 14. As a result, the sugar alcohol contained in the heat storage material composition 14 is melted. Thus, heat can be stored in the heat storage material composition 14 in the form of latent heat.

As illustrated in FIG. 1, the supercooling maintaining step involves maintaining the temperature of the heat storage material composition 14 inside the containers 12 at a temperature lower than the melting point of the sugar alcohol contained in the heat storage material composition 14 and maintaining the heat storage material composition 14 in a supercooled state. The supercooling maintaining step is performed after completion of the heat storing step. The heat storing step ends when the pump 16 stops operation during the heat storing step. Once the pump 16 stops, supply of the heat medium from the heat source device 20 to the heat storage device 10 stops and the temperature of the heat storage material composition 14 drops to a temperature lower than the melting point of the sugar alcohol contained in the heat storage material composition 14, thereby making transition to the supercooling maintaining step. The temperature of the heat storage material composition 14 drops to, for example, room temperature or a temperature near room temperature (for example, 25° C. to 60° C.). The stabilizer contained in the heat storage material composition 14 suppresses crystallization (solidification) of the sugar alcohol contained in the heat-storing material composition 14 and thus the heat storage material composition 14 can maintain a liquid state (supercooled state). In the supercooling maintaining step, the heat storage material composition 14 can be warmed to a particular temperature by supplying a heat medium of a particular temperature to the interior of the heat storage device 10 in order to prevent excessive drop of the temperature of the heat storage material composition 14 caused by changes in outside temperature and the like.

As illustrated in FIG. 1, the supercooling releasing step involves solidifying the sugar alcohol contained in the heat storage material composition 14. In the supercooling releasing step, for example, the supercooled state of the heat storage material composition 14 is released by the supercooling releaser 24. As a result, the sugar alcohol contained in the heat storage material composition 14 crystallizes (solidifies). Alternatively, the supercooling releaser 24 may be omitted and the supercooled state of the heat storage material composition 14 may be released by supplying a low-temperature heat medium from the heat output device 22.

The heat recovery step involves causing the flow of the heat medium to receive, through the containers 12, at least part of the heat released from the heat storage material composition 14 by solidification of the sugar alcohol contained in the heat storage material composition 14. The heat recovery step is performed simultaneously with the supercooling releasing step. In the heat recovery step, the three-way valve 18 is controlled so that the heat medium is supplied from the heat output device 22 to the heat storage device 10 and returns from the heat storage device 10 to the heat output device 22. As indicated by a broken arrow in FIG. 2, the heat medium circulates between the heat output device 22 and the heat storage device 10 by operation of the pump 16. The heat medium is, for example, oil. The heat medium has a temperature lower than the temperature of the heat storage material composition 14. As the sugar alcohol contained in the heat storage material composition 14 solidifies, the heat released from the heat storage material composition 14 heats the containers 12. The heat medium flows in the inner channel 15 inside the heat storage device 10 and the flow of the heat medium receives heat from the containers 12. The heat medium receiving heat from the containers 12 is supplied to the heat output device 22. As a result, at least part of the heat released from the heat storage material composition 14 by solidification of the sugar alcohol contained in the heat storage material composition 14 is recovered. The recovered heat is used for heating rooms and supplying hot water by the heat output device 22, for example.

It is possible to store heat by causing the heat storage material composition 14 to flow without placing the heat storage material composition 14 in the containers 12. However, considering the sugar alcohol content, the fluidity of the heat storage material composition 14 before the heat storing step is possibly not very high. Accordingly, the heat storing step, the supercooling maintaining step, the supercooling releasing step, and the heat recovery step are preferably performed while having the heat storage material composition 14 inside the containers 12. The heat storage material composition of the present disclosure can be used not only in the heat storage system 100 but also in other systems.

EXAMPLES

The heat storage material composition of the present disclosure will now be described in further detail by using Examples which do not limit the scope of the present disclosure.

Method for Evaluating Supercooling Stability

A method for evaluating the supercooling stability of heat storage material compositions of Examples, Comparative Examples, and Reference Examples is first described. The heat storage material compositions of Examples, Comparative Examples, and Reference Examples contained erythritol (product of Nippon Garlic Corporation) as a sugar alcohol. A glass sample jar containing a heat storage material composition of Example, Comparative Example, or Reference Example was placed in a drying furnace set at 130° C. so as to melt erythritol. Then the temperature of the drying furnace was decreased to at least 25° C. at a temperature decreasing rate of 0.83° C./min. The temperature of the heat storage material composition of Example, Comparative Example, or Reference Example was measured during this process, and the temperature of the heat storage material composition at the time solid-phase erythritol was generated was assumed to be the crystallization onset temperature. Here, generation of solid-phase erythritol was determined on the basis of the increase in temperature of the heat storage material composition. The lower the crystallization onset temperature of the heat storage material composition, the more stable the supercooled state of the heat storage material composition.

Example A1

In a glass sample jar, 3.0 g of erythritol (product of Nippon Garlic Corporation) and 0.03 g of sodium acetate were mixed to prepare a heat storage material composition of Example A1. The crystallization onset temperature of the heat storage material composition of Example A1 is indicated in Table 1.

Examples A2 to A10

Heat storage material compositions of Examples A2 to A10 were prepared as in Example A1 except that the amount of sodium acetate placed in the glass sample jar was changed as indicated in Table 1. The crystallization onset temperatures of the heat storage material compositions of Examples A2 to A10 are indicated in Table 1. In the tables below, the notation "25 (<24 h)" in the column of the crystallization onset temperature means that solid-phase erythritol occurred within 24 hours during which the temperature of the heat storage material composition was held at 25° C. In the tables below, the notation "25 (>24 h)" means that solid-phase erythritol did not occur within 24 hours during which the temperature of the heat storage material composition was held at 25° C.

TABLE 1

| Example | Erythritol content Wa [g] | Sodium acetate content Ws [g] | Ws/Wa | Crystallization onset temperature [° C.] |
|---|---|---|---|---|
| A1 | 3.0 | 0.03 | 0.01 | 28.6 |
| A2 | 3.0 | 0.06 | 0.02 | 28.5 |
| A3 | 3.0 | 0.12 | 0.04 | 25 (<24 h) |
| A4 | 3.0 | 0.15 | 0.05 | 25 (<24 h) |
| A5 | 3.0 | 0.18 | 0.06 | 25 (<24 h) |
| A6 | 3.0 | 0.24 | 0.08 | 25 (<24 h) |
| A7 | 3.0 | 0.30 | 0.10 | 25 (>24 h) |
| A8 | 3.0 | 0.45 | 0.15 | 25 (>24 h) |
| A9 | 3.0 | 0.60 | 0.20 | 25 (>24 h) |
| A10 | 3.0 | 0.90 | 0.30 | 25 (>24 h) |

Examples B1 to B5

Heat storage material compositions of Examples B1 to B5 were prepared as in Example A1 except that, instead of sodium acetate, ammonium acetate in an amount indicated in Table 2 was placed in a glass sample jar. The crystallization onset temperatures of the heat storage material compositions of Examples B1 to B5 are indicated in Table 2.

TABLE 2

| Example | Erythritol content Wa [g] | Ammonium acetate content Ws [g] | Ws/Wa | Crystallization onset temperature [° C.] |
|---|---|---|---|---|
| B1 | 3.0 | 0.15 | 0.05 | 25 (<24 h) |
| B2 | 3.0 | 0.30 | 0.10 | 25 (<24 h) |
| B3 | 3.0 | 0.45 | 0.15 | 25 (>24 h) |
| B4 | 3.0 | 0.60 | 0.20 | 25 (>24 h) |
| B5 | 3.0 | 0.90 | 0.30 | 25 (>24 h) |

Examples C1 to C5

Heat storage material compositions of Examples C1 to C5 were prepared as in Example A1 except that, instead of sodium acetate, potassium acetate in an amount indicated in Table 3 was placed in a glass sample jar. The crystallization onset temperatures of the heat storage material compositions of Examples C1 to C5 are indicated in Table 3.

TABLE 3

| Example | Erythritol content Wa [g] | Potassium acetate content Ws [g] | Ws/Wa | Crystallization onset temperature [° C.] |
|---|---|---|---|---|
| C1 | 3.0 | 0.15 | 0.05 | 28.3 |
| C2 | 3.0 | 0.30 | 0.10 | 25 (>24 h) |
| C3 | 3.0 | 0.45 | 0.15 | 25 (>24 h) |

TABLE 3-continued

| Example | Erythritol content Wa [g] | Potassium acetate content Ws [g] | Ws/Wa | Crystallization onset temperature [° C.] |
|---|---|---|---|---|
| C4 | 3.0 | 0.60 | 0.20 | 25 (>24 h) |
| C5 | 3.0 | 0.90 | 0.30 | 25 (>24 h) |

Examples D1 to D5

Heat storage material compositions of Examples D1 to D5 were prepared as in Example A1 except that, instead of sodium acetate, sodium acrylate in an amount indicated in Table 4 was placed in a glass sample jar. The crystallization onset temperatures of the heat storage material compositions of Examples D1 to D5 are indicated in Table 4.

TABLE 4

| Example | Erythritol content Wa [g] | Sodium acrylate content Ws [g] | Ws/Wa | Crystallization onset temperature [° C.] |
|---|---|---|---|---|
| D1 | 3.0 | 0.15 | 0.05 | 25 (<24 h) |
| D2 | 3.0 | 0.30 | 0.10 | 25 (<24 h) |
| D3 | 3.0 | 0.45 | 0.15 | 25 (>24 h) |
| D4 | 3.0 | 0.60 | 0.20 | 25 (>24 h) |
| D5 | 3.0 | 0.90 | 0.30 | 25 (>24 h) |

Examples E1 to E5

Heat storage material compositions of Examples E1 to E5 were prepared as in Example A1 except that, instead of sodium acetate, sodium polyacrylate (molecular weight: 2,700 to 7,500) in an amount indicated in Table 5 was placed in a glass sample jar. The crystallization onset temperatures of the heat storage material compositions of Examples E1 to E5 are indicated in Table 5.

TABLE 5

| Example | Erythritol content Wa [g] | Sodium polyacrylate (molecular weight: 2,700 to 7,500) content Ws [g] | Ws/Wa | Crystallization onset temperature [° C.] |
|---|---|---|---|---|
| E1 | 3.0 | 0.15 | 0.05 | 27.3 |
| E2 | 3.0 | 0.30 | 0.10 | 25 (<24 h) |
| E3 | 3.0 | 0.45 | 0.15 | 25 (<24 h) |
| E4 | 3.0 | 0.60 | 0.20 | 25 (<24 h) |
| E5 | 3.0 | 0.90 | 0.30 | 25 (<24 h) |

Examples F1 to F5

Heat storage material compositions of Examples F1 to F5 were prepared as in Example A1 except that, instead of sodium acetate, sodium polyacrylate (molecular weight: 22,000 to 70,000) in an amount indicated in Table 6 was placed in a glass sample jar. The crystallization onset temperatures of the heat storage material compositions of Examples F1 to F5 are indicated in Table 6.

TABLE 6

| Example | Erythritol content Wa [g] | Sodium polyacrylate (molecular weight: 22,000 to 70,000) content Ws [g] | Ws/Wa | Crystallization onset temperature [° C.] |
|---|---|---|---|---|
| F1 | 3.0 | 0.15 | 0.05 | 31.3 |
| F2 | 3.0 | 0.30 | 0.10 | 33.2 |
| F3 | 3.0 | 0.45 | 0.15 | 31.9 |
| F4 | 3.0 | 0.60 | 0.20 | 30.0 |
| F5 | 3.0 | 0.90 | 0.30 | 26.8 |

Examples G1 to G10

Heat storage material compositions of Examples G1 to G10 were prepared as in Example A1 except that, instead of sodium acetate, sodium chloride in an amount indicated in Table 7 was placed in a glass sample jar. The crystallization onset temperatures of the heat storage material compositions of Examples G1 to G10 are indicated in Table 7.

TABLE 7

| Example | Erythritol content Wa [g] | Sodium acetate content Ws [g] | Ws/Wa | Crystallization onset temperature [° C.] |
|---|---|---|---|---|
| G1 | 3.0 | 0.03 | 0.01 | 27.2 |
| G2 | 3.0 | 0.06 | 0.02 | 28.4 |
| G3 | 3.0 | 0.12 | 0.04 | 27.6 |
| G4 | 3.0 | 0.15 | 0.05 | 25 (<24 h) |
| G5 | 3.0 | 0.18 | 0.06 | 25 (<24 h) |
| G6 | 3.0 | 0.24 | 0.08 | 25 (<24 h) |
| G7 | 3.0 | 0.30 | 0.10 | 25 (>24 h) |
| G8 | 3.0 | 0.45 | 0.15 | 25 (>24 h) |
| G9 | 3.0 | 0.60 | 0.20 | 25 (>24 h) |
| G10 | 3.0 | 0.90 | 0.30 | 25 (>24 h) |

Examples H1 to H3

Heat storage material compositions of Examples H1 to H3 were prepared as in Example A1 except that, instead of sodium acetate, sodium nitrate in an amount indicated in Table 8 was placed in a glass sample jar. The crystallization onset temperatures of the heat storage material compositions of Examples H1 to H3 are indicated in Table 8.

TABLE 8

| Example | Erythritol content Wa [g] | Sodium nitrate content Ws [g] | Ws/Wa | Crystallization onset temperature [° C.] |
|---|---|---|---|---|
| H1 | 3.0 | 0.15 | 0.05 | 40.8 |
| H2 | 3.0 | 0.45 | 0.15 | 28.6 |
| H3 | 3.0 | 0.90 | 0.30 | 25.3 |

Examples I1 to I7

Heat storage material compositions of Examples I1 to I7 were prepared as in Example A1 except that, instead of sodium acetate, sodium hydrogencarbonate in an amount indicated in Table 9 was placed in a glass sample jar. The crystallization onset temperatures of the heat storage material compositions of Examples I1 to I7 are indicated in Table 9.

TABLE 9

| Example | Erythritol content Wa [g] | Sodium hydrogencarbonate content Ws [g] | Ws/Wa | Crystallization onset temperature [° C.] |
| --- | --- | --- | --- | --- |
| I1 | 3.0 | 0.06 | 0.02 | 30.2 |
| I2 | 3.0 | 0.12 | 0.04 | 31.3 |
| I3 | 3.0 | 0.18 | 0.06 | 29.5 |
| I4 | 3.0 | 0.24 | 0.08 | 29.8 |
| I5 | 3.0 | 0.3 | 0.10 | 25 (<24 h) |
| I6 | 3.0 | 0.6 | 0.20 | 25 (<24 h) |
| I7 | 3.0 | 0.9 | 0.30 | 25 (<24 h) |

Examples J1 to J5

Heat storage material compositions of Examples J1 to J5 were prepared as in Example A1 except that, instead of sodium acetate, polyethylene glycol (molecular weight: 7,300 to 9,300) in an amount indicated in Table 10 was placed in a glass sample jar. The crystallization onset temperatures of the heat storage material compositions of Examples J1 to J5 are indicated in Table 10.

TABLE 10

| Example | Erythritol content Wa [g] | Polyethylene glycol (molecular weight: 7,300 to 9,300) content Ws [g] | Ws/Wa | Crystallization onset temperature [° C.] |
| --- | --- | --- | --- | --- |
| J1 | 3.0 | 0.15 | 0.05 | 42.6 |
| J2 | 3.0 | 0.30 | 0.10 | 30.2 |
| J3 | 3.0 | 0.45 | 0.15 | 25 (<24 h) |
| J4 | 3.0 | 0.60 | 0.20 | 27.7 |
| J5 | 3.0 | 0.90 | 0.30 | 25.7 |

Examples K1 to K7

Heat storage material compositions of Examples K1 to K7 were prepared as in Example A1 except that, instead of sodium acetate, polyethylene glycol (molecular weight: 300,000 to 500,000) in an amount indicated in Table 11 was placed in a glass sample jar. The crystallization onset temperatures of the heat storage material compositions of Examples K1 to K7 are indicated in Table 11.

TABLE 11

| Example | Erythritol content Wa [g] | Polyethylene glycol (molecular weight: 300,000 to 500,000) content Ws [g] | Ws/Wa | Crystallization onset temperature [° C.] |
| --- | --- | --- | --- | --- |
| K1 | 3.0 | 0.03 | 0.01 | 39.8 |
| K2 | 3.0 | 0.06 | 0.02 | 42.5 |
| K3 | 3.0 | 0.12 | 0.04 | 28.8 |
| K4 | 3.0 | 0.15 | 0.05 | 31.1 |
| K5 | 3.0 | 0.18 | 0.06 | 25.7 |
| K6 | 3.0 | 0.24 | 0.08 | 25 (<24 h) |
| K7 | 3.0 | 0.45 | 0.15 | 48.7 |

Examples L1 to L6

Heat storage material compositions of Examples L1 to L6 were prepared as in Example A1 except that, instead of sodium acetate, polyethylene glycol (molecular weight: 3,500,000 to 4,000,000) in an amount indicated in Table 12 was placed in a glass sample jar. The crystallization onset temperatures of the heat storage material compositions of Examples L1 to L6 are indicated in Table 12.

TABLE 12

| Example | Erythritol content Wa [g] | Polyethylene glycol (molecular weight: 3,500,000 to 4,000,000) content Ws [g] | Ws/Wa | Crystallization onset temperature [° C.] |
| --- | --- | --- | --- | --- |
| L1 | 3.0 | 0.03 | 0.01 | 33.2 |
| L2 | 3.0 | 0.06 | 0.02 | 33.7 |
| L3 | 3.0 | 0.12 | 0.04 | 26.1 |
| L4 | 3.0 | 0.15 | 0.05 | 38.4 |
| L5 | 3.0 | 0.18 | 0.06 | 26.3 |
| L6 | 3.0 | 0.24 | 0.08 | 27.5 |

Comparative Example A1

A heat storage material composition of Comparative Example A1 was prepared by placing 3.0 g of erythritol (product of Nippon Garlic Corporation) only in a glass sample jar. The crystallization onset temperature of the heat storage material composition of Comparative Example A1 was 62.1° C.

Comparative Examples B1 to B5

Heat storage material compositions of Comparative Examples B1 to B5 were prepared as in Example A1 except that, instead of sodium acetate, sodium sulfate in an amount indicated in Table 13 was placed in a glass sample jar. The crystallization onset temperatures of the heat storage material compositions of Comparative Examples B1 to B5 are indicated in Table 13. The solubility of sodium sulfate in 100 mL of 20° C. water is 19.1 g and a sulfate ion is an anion and is divalent.

TABLE 13

| Comparative Example | Erythritol content Wa [g] | Sodium sulfate content Ws [g] | Ws/Wa | Crystallization onset temperature [° C.] |
| --- | --- | --- | --- | --- |
| B1 | 3.0 | 0.15 | 0.05 | 91.0 |
| B2 | 3.0 | 0.30 | 0.10 | 88.7 |
| B3 | 3.0 | 0.45 | 0.15 | 90.9 |
| B4 | 3.0 | 0.60 | 0.20 | 84.4 |
| B5 | 3.0 | 0.90 | 0.30 | 111.7 |

Comparative Examples C1 to C5

Heat storage material compositions of Comparative Examples C1 to C5 were prepared as in Example A1 except that, instead of sodium acetate, sodium hydrogenphosphate in an amount indicated in Table 14 was placed in a glass sample jar. The crystallization onset temperatures of the heat storage material compositions of Comparative Examples C1 to C5 are indicated in Table 14. The solubility of sodium hydrogenphosphate in 100 mL of 20° C. water is 7.7 g, and a hydrogenphosphate ion is an anion and is divalent.

TABLE 14

| Comparative Example | Erythritol content Wa [g] | Sodium hydrogenphosphate content Ws [g] | Ws/Wa | Crystallization onset temperature [° C.] |
|---|---|---|---|---|
| C1 | 3.0 | 0.15 | 0.05 | 110.3 |
| C2 | 3.0 | 0.30 | 0.10 | 112.1 |
| C3 | 3.0 | 0.45 | 0.15 | 112.0 |
| C4 | 3.0 | 0.60 | 0.20 | 112.2 |
| C5 | 3.0 | 0.90 | 0.30 | 111.8 |

Reference Examples 1 to 3

Heat storage material compositions of Reference Examples 1 to 3 were prepared as in Example A1 except that, instead of sodium acetate, side-chain-type polyether-modified silicone (trade name: KF-354L produced by Shin-Etsu Chemical Co., Ltd.) in an amount indicated in Table 15 was placed in a glass sample jar. The crystallization onset temperatures of the heat storage material compositions of Reference Examples 1 to 3 are indicated in Table 15.

TABLE 15

| Reference Example | Erythritol content Wa [g] | Side-chain-type polyether-modified silicone (KF-354L) content Ws [g] | Ws/Wa | Crystallization onset temperature [° C.] |
|---|---|---|---|---|
| 1 | 3.0 | 0.03 | 0.01 | 44.6 |
| 2 | 3.0 | 0.06 | 0.02 | 46.9 |
| 3 | 3.0 | 0.15 | 0.05 | 43.4 |

As indicated in Tables 1 to 12, the crystallization onset temperatures of the heat storage material compositions of Examples are all significantly lower than the crystallization onset temperature of the heat storage material composition of Comparative Example A1. This illustrates that all of the heat storage material compositions of Examples can stably maintain a supercooled state at room temperature or a temperature near room temperature (for example, 25° C. to 60° C.). Moreover, the crystallization onset temperatures of the heat storage material compositions of Examples A1, G1, K1, and L1 are lower than the crystallization onset temperature of the heat storage material composition of Reference Example 1, and the crystallization onset temperatures of the heat storage material compositions of Examples A2, G2, I1, K2, and L2 are lower than the crystallization onset temperature of the heat storage material composition of Reference Example 2. The crystallization onset temperatures of the heat storage material compositions of Examples A4, B1, C1, D1, E1, F1, G4, H1, J1, K4, and L4 are lower than the crystallization onset temperature of the heat storage material composition of Reference Example 3. This suggests that the heat storage material compositions containing the crystallization stabilizer of the present disclosure can maintain the supercooled state at a higher stability than the heat storage material compositions that use side-chain-type polyether-modified silicone as the stabilizer.

The crystallization onset temperatures of the heat storage material compositions of Comparative Examples B1 to B5 and C1 to C5 are higher than the crystallization onset temperature of the heat storage material composition of Comparative Example A1. This suggests that it is difficult to use, as a stabilizer, a salt having a solubility of less than 9 g in 100 mL of 20° C. water and a salt having a solubility equal to or more than 9 g in 100 mL of 20° C. water and whose anion is divalent.

Studies on Supercooling Stabilization Mechanism

Figure 3:
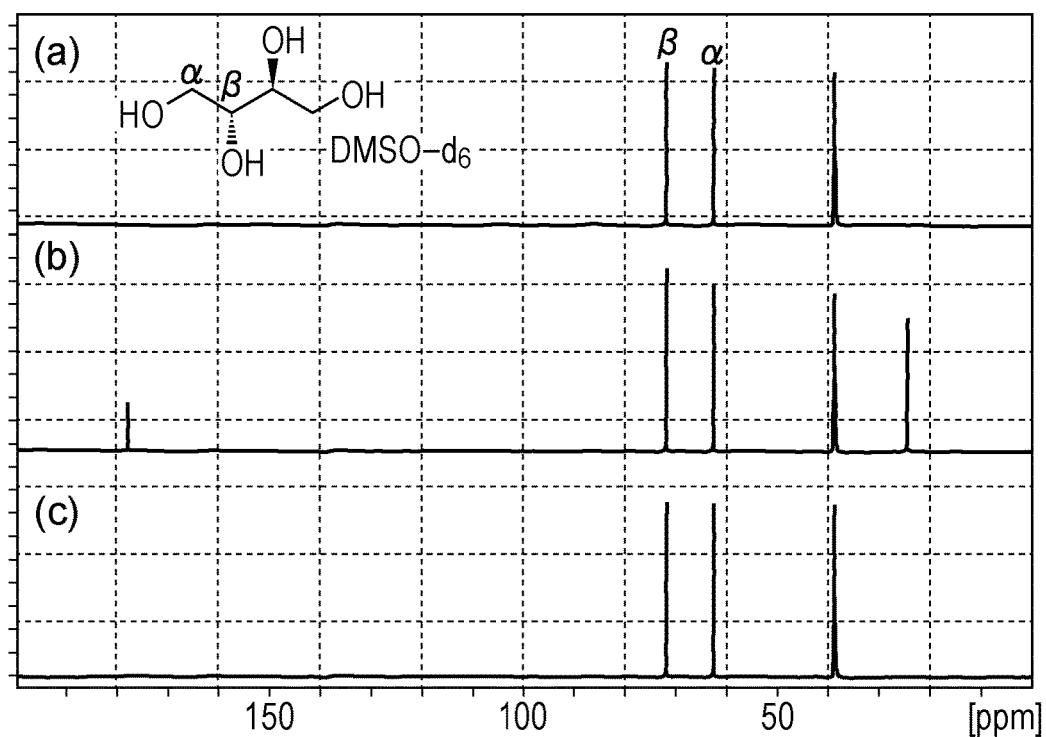
FIG. 3 illustrates a nuclear magnetic resonance (NMR) spectrum of samples, (a) is as to a sample that contains erythritol only, (b) is as to a sample containing erythritol and sodium acetate, and (c) is as to a sample containing erythritol and sodium nitrate.
Figure 4:
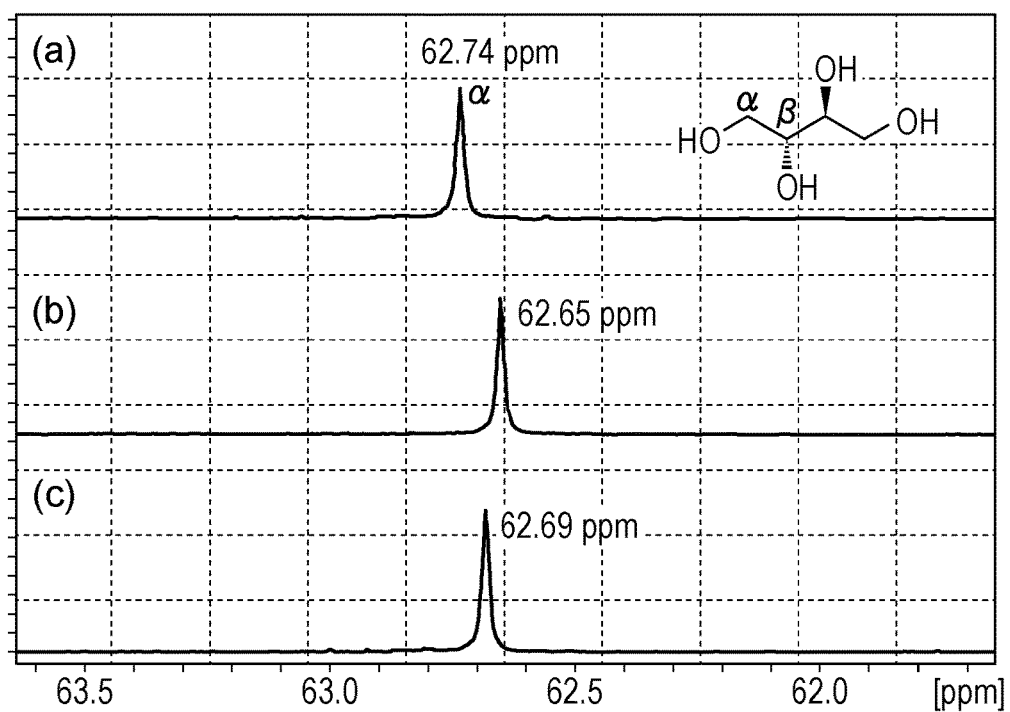
FIG. 4 is an enlarged segment near a peak α of the NMR spectrum of FIG. 3, (a) is as to (a) of FIG. 3, (b) is as to (b) of FIG. 3, and (c) is as to (c) of FIG. 3.
Figure 5:
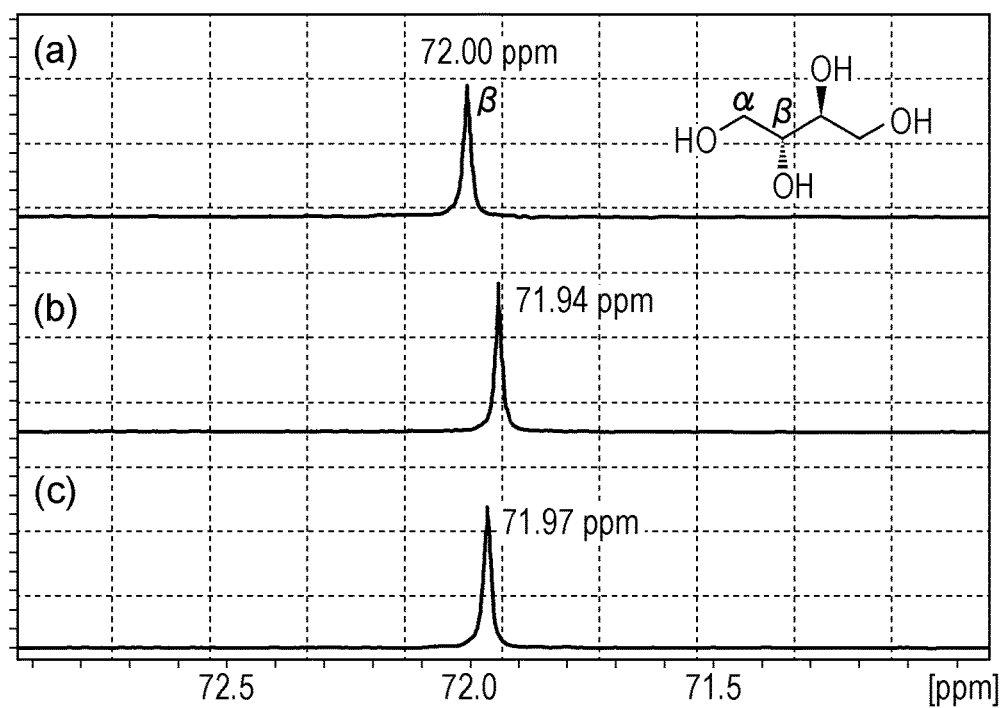
FIG. 5 is an enlarged segment near a peak β of the NMR spectrum of FIG. 3, (a) is as to (a) of FIG. 3, (b) is as to (b) of FIG. 3, and (c) is as to (c) of FIG. 3.

The mechanism with which the heat storage material composition of the present disclosure stably maintains a supercooled state by incorporation of a stabilizer is studied. In a deuterated solvent (780 mg) containing 30 wt % of deuterated water and 70 wt % of deuterated dimethyl sulfoxide (DMSO), 20 mg of erythritol was dissolved to obtain Sample 1. A mixed sample (20 mg) containing the same weight of sodium acetate and erythritol was dissolved in a deuterated solvent (780 mg) containing 30 wt % of deuterated water and 70 wt % of deuterated dimethyl sulfoxide (DMSO) to obtain Sample 2. Sample 3 was obtained as with Sample 2 except that sodium nitrate was used instead of sodium acetate. Samples 1 to 3 were subjected to $^{13}$C-NMR (nuclear magnetic resonance) analysis by using an NMR analyzer (trade name: AVANCE 500 produced by Bruker Corporation). The results are indicated in FIGS. 3 to 5. In FIG. 3, (a) illustrates a nuclear magnetic resonance (NMR) spectrum of a sample that contains erythritol only, (b) illustrates a NMR spectrum of a sample containing erythritol and sodium acetate, and (c) illustrates a NMR spectrum of a sample containing erythritol and sodium nitrate. In FIG. 4, (a) is an enlarged segment near a peak α of the NMR spectrum as to (a) of FIG. 3. In FIG. 4, (b) is an enlarged segment near a peak α of the NMR spectrum as to (b) of FIG. 3. In FIG. 4, (c) is an enlarged segment near a peak α of the NMR spectrum as to (c) of FIG. 3. In FIG. 5, (a) is an enlarged segment near a peak β of the NMR spectrum as to (a) of FIG. 3. In FIG. 5, (b) is an enlarged segment near a peak β of the NMR spectrum as to (b) of FIG. 3. In FIG. 5, (c) is an enlarged segment near a peak β of the NMR spectrum as to (c) of FIG. 3.

Figure 6:
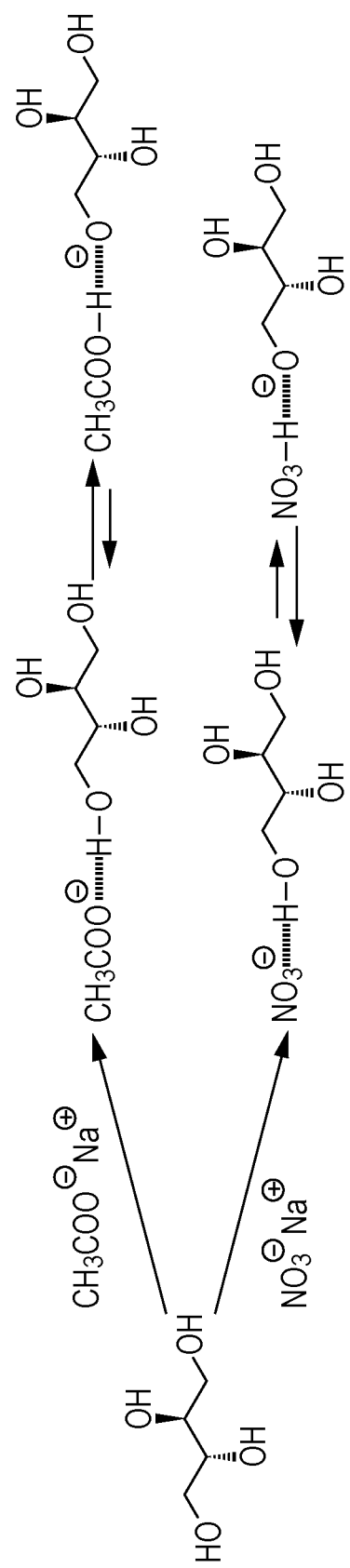
FIG. 6 is diagram illustrating an interaction between erythritol and sodium acetate or sodium nitrate.

As illustrated in FIGS. 4 and 5, the peaks α and the peaks β of Samples 2 and 3 are shifted toward the right side (high-magnetic-field side) with respect to the peak α and the peak β of Sample 1. The peak α and the peak β of Sample 2 are shifted toward the right side (high-magnetic-field side) with respect to the peak α and the peak β of Sample 3. The larger the shift of the peak α and the peak β toward the high-magnetic-field side, the larger the interaction between erythritol and sodium acetate or sodium nitrate. In other words, it is considered that sodium acetate exhibits a larger interaction with erythritol than sodium nitrate does. As illustrated in FIG. 6, when erythritol and sodium acetate coexist, an acetate ion interacts with a hydroxyl group of erythritol. When erythritol and sodium nitrate coexist, a nitrate ion interacts with a hydroxyl group of erythritol. As illustrated in FIG. 6, an acetate ion has a higher tendency to protonate and withdraw a hydrogen atom of a hydroxyl group of erythritol than a nitrate ion. In other words, as illustrated in FIG. 6, compared to the resonance associated with the interaction between a nitrate ion and erythritol, the resonance associated with the interaction between an acetate ion and erythritol tends to reach an equilibrium that more strongly favors the state on the right-hand side.

It can be derived from the results indicated in Tables 1 and 8 and FIGS. 4 and 5 that the magnitude of the shift toward the high-magnetic-field side (magnitude of interaction) is relevant to the effect of suppressing crystallization of erythritol. In other words, the larger the interaction between erythritol and the stabilizer, the more suppressed crystallization (solidification) of erythritol, thereby promoting supercooling.

Second Embodiment

A heat storage device according to a second embodiment will now be described with reference to drawings. Constitutional elements common to the first embodiment and the second embodiment are represented by the same reference symbols and referred by the same names and descriptions therefor are omitted. The description below concerns an illustrative example of the present disclosure and does not limit the present disclosure.

As illustrated in FIG. 7, a heat storage device 27 according to the present disclosure includes a heat storage material composition 14 and a pair of electrodes 26. The heat storage material composition 14 contains a sugar alcohol and a stabilizer. The stabilizer is a salt having a solubility of 9 g or more in 100 mL of 20° C. water. The pair of electrodes 26 is arranged to be in contact with the heat storage material composition 14. At least one of the pair of electrodes 26 contains silver or a silver compound, or the heat storage material composition 14 contains a silver ion when in a liquid state. In the heat storage device 27, voltage is applied between the pair of electrodes 26 when the heat storage material composition 14 is in a liquid state and a supercooled state so that the supercooled state of the heat storage material composition 14 is released. For example, as illustrated in FIG. 7, each of the pair of electrodes 26 is electrically connected to a DC power source 21a through wiring, and a switch 23 is provided between the DC power source 21a and at least one of the pair of electrodes 26. When the switch 23 is closed, voltage is applied between the pair of electrodes 26. Alternatively, as illustrated in FIG. 8, each of the pair of electrodes 26 may be electrically connected to an AC power source 21b through wiring.

Referring to FIG. 7, the heat storage device 27 further includes, for example, containers 12, a center casing 30, an end member 31a, an end member 31b, a flow control member 40a, and a flow control member 40b. The containers 12 are composed of a thermally conductive material. The heat storage material composition 14 is contained in the containers 12. The center casing 30 is a cylindrical casing composed of a thermally insulating material. Plural containers 12 containing the heat storage material composition 14 are arranged in the inside space of the center casing 30. The outer peripheral surfaces of the containers 12 and the inner peripheral surface of the center casing 30 form an inner channel 15 in the inside space of the center casing 30. The inner channel 15 is a channel through which a heat medium for applying heat to the heat storage material composition 14 and recovering heat from the heat storage material composition 14 flows. The end member 31a is fixed to one end of the center casing 30, and the end member 31b is fixed to the other end of the center casing 30. The end member 31a and the end member 31b are each a funnel-shaped member and form a space that widens toward the center casing 30. The end member 31a and the end member 31b form an inlet or outlet of the heat medium. The flow control member 40a is fixed onto the inner side of the end member 31a at one end of the center casing 30, and the flow control member 40b is fixed onto the inner side of the end member 31b at the other end of the center casing 30. The flow control member 40a and the flow control member 40b are each a plate-shaped member with penetrating holes and control the flow of the heat medium.

The pair of electrodes 26 have an exposed outer portion protruding from the center casing 30 and an inner portion that lies in the inside space of the center casing 30 and penetrates through the containers 12. In the case where the heat storage device 27 includes plural containers 12, the heat storage device 27 may include plural pairs of electrodes 22 so that one pair of electrodes 26 comes into contact with the heat storage material composition 14 contained in one of the plural containers 12. In this case, the plural pairs of electrodes 22 are, for example, electrically connected in parallel relative to the DC power source 21a. The distance between the portions of the pair of electrodes 26 in contact with the heat storage material composition 14 is not particularly limited but may be, for example, 1 mm to 15 mm.

In the case where at least one of the pair of electrodes 26 contains silver or a silver compound, that silver or silver compound is present at least in a portion of a surface of the at least one of the pair of electrodes 26, the portion contacting the heat storage material composition 14. As illustrated in FIG. 7, in the case where the pair of electrodes 26 is connected to the DC power source 21a, silver or a silver compound is preferably contained in an electrode (positive electrode) connected to a high-potential-side of the DC power source 21a among the pair of electrodes 26. As a result, compared to the case where silver or a silver compound is not contained in the positive electrode but in an electrode (negative electrode) connected to the lower-potential-side of the DC power source 21a among the pair of electrodes 26, the supercooled state of the heat storage material composition 14 can be released with a smaller amount of energy. As illustrated in FIG. 8, in the case where the pair of electrodes 26 is connected to the AC power source 21b, both of the pair of electrodes 26 may contain silver or a silver compound. The silver compound contained in at least one of the pair of electrodes 26 is, for example, silver chloride. The shape of the pair of electrodes 26 is not particularly limited but may be, for example, a plate shape or a wire shape.

In the case where the heat storage material composition 14 contains a silver ion when in a liquid state, the heat storage material composition 14 contains, for example, a silver compound soluble in a sugar alcohol in a liquid state. Examples of such a silver compound include silver nitrate and silver acetate. This silver compound may be contained in the heat storage material composition 14 to serve as a stabilizer or as any other component. In such a case, the pair of electrodes 26 does not have to contain silver or a silver compound and may contain, for example, a metal, such as copper, other than silver or carbon.

Next, an example of a heat storage method using the heat storage device 27 is described. As illustrated in FIG. 9, the heat storage method according to the present disclosure includes a step S1, a step S2, a step S3, a step S4, and a step S5. The step S1 is a step of preparing a heat storage device 27 in which the sugar alcohol contained in the heat storage material composition 14 is in a solid state. The step S2 is a heat storing step of increasing the temperature of the heat storage material composition 14 to a temperature equal to or higher than the melting point of the sugar alcohol contained in the heat storage material composition 14 so as to melt the sugar alcohol in a solid state. The step S2 is carried out by, for example, supplying a heat medium having a temperature higher than the melting point of the sugar alcohol contained in the heat storage material composition 14 to the interior of the heat storage device 27 so that the heat medium passes through the inner channel 15 as it flows from the end member 31a toward the end member 31b.

The step S3 is a supercooling maintaining step of maintaining the temperature of the heat storage material composition 14 at a temperature lower than the melting point of the sugar alcohol and maintaining the heat storage material composition 14 in a supercooled state. In the step S3, the temperature of the heat storage material composition 14 is maintained so that the heat storage material composition 14 has a temperature higher than the crystallization onset temperature of the heat storage material composition 14 but lower than the melting point of the sugar alcohol. For example, in the step S3, the temperature of the heat storage material composition 14 is preferably maintained such that the supercooling degree determined by subtracting the temperature of the heat storage material composition 14 from the melting point of the sugar alcohol falls in the range of 19° C. to 90° C. The heat storage material composition 14 preferably contains a stabilizer so that the supercooled state of the sugar alcohol is maintained within the temperature range.

The step S4 is a supercooling releasing step of applying voltage to the pair of electrodes 26 when the heat storage material composition 14 is in a liquid state and a supercooled state so that the supercooled state of the heat storage material composition 14 is released. The step S4 is performed, for example, after the step S3. In the step S4, for example, the switch 23 is closed, and either DC voltage is applied to the pair of electrodes 26 from the DC power source 21a or AC voltage is applied to the pair of electrodes 26 from the AC power source 21b. As a result, electrical stimuli are applied to the heat storage material composition 14, a metastable supercooled state is released, and phase shift to an energetically more stable crystal state (solid state) starts. As a result, the heat stored in the heat storage material composition 14 is released.

The magnitude of the voltage applied to the pair of electrodes 26 is, for example, 1 to 3 V. It is possible that the heat storage material composition 14 contains water. In such a case, electrolysis of water caused by application of voltage between the pair of electrodes 26 is preferably avoided. From this perspective, the magnitude of the voltage applied to the pair of electrodes 26 is preferably 1.23 V or less. In the case where AC voltage is applied to the pair of electrodes 26, the peak-to-peak amplitude is, for example, 1.0 Vpp to 6.0 Vpp. The frequency of the AC voltage is not particularly limited but is preferably 10 Hz or less considering the limitation of the ion migration speed.

The step S5 is a heat recovery step of recovering at least part of the heat released from the heat storage material composition 14 as a result of the release of the supercooled state of the heat storage material composition 14. The step S5 is performed immediately after the supercooled state of the heat storage material composition 14 is released by application of voltage to the pair of electrodes 26. In other words, the step S5 is performed immediately after the step S4. The step S5 is carried out by, for example, supplying a heat medium having a temperature lower than the temperature of the heat storage material composition 14 to the interior of the heat storage device 27 so that the heat medium passes through the inner channel 15 as it flows from the end member 31a to the end member 31b.

EXAMPLES

The heat storage device and the heat storage method according to the present disclosure will now be described in further detail by using Examples which do not limit the scope of the present disclosure.

Method for Evaluating Supercooling Stability

A glass sample jar containing 3.0 g of erythritol (product of Nippon Garlic Corporation) was placed in a drying furnace whose inner temperature was set at 130° C. and erythritol was melted. The temperature setting of the drying furnace was then decreased from 130° C. at a rate of 0.83° C./min. The temperature of erythritol in the sample jar at the time solid-phase erythritol was generated was 62.1° C. Generation of solid-phase erythritol is determined on the basis of the increase in the temperature of erythritol in the sample jar.

Plural glass samples jars each containing 3.0 g of erythritol (product of Nippon Garlic Corporation) were prepared. To each sample jar, sodium acetate, potassium acetate, sodium chloride, calcium chloride, sodium hydroxide, silver nitrate, or sodium hydrogencarbonate serving as a stabilizer was added so that ratio Ws/Wa of the mass Ws of the stabilizer to the mass Wa of erythritol was 0.01 or more. Each sample jar containing erythritol and a stabilizer was placed in a drying furnace whose inner temperature was set to 130° C. and erythritol was melted. The temperature setting of the drying furnace was then decreased from 130° C. at a rate of 0.83° C./min to 25° C. at the lowest. In all sample jars, solid-phase erythritol was generated at a temperature lower than 62.1° C. in terms of temperature of the mixture in the sample jars. For example, in a sample jar containing 0.03 g of sodium acetate, solid-phase erythritol was generated when the temperature of the mixture in the sample jar was decreased to 28.6° C. In a sample jar containing 0.12 g of sodium acetate, solid-phase erythritol occurred within 24 hours from the time the temperature of the mixture in the sample jar decreased to 25° C. It was thus confirmed that sodium acetate, potassium acetate, sodium chloride, calcium chloride, sodium hydroxide, silver nitrate, or sodium hydrogencarbonate decreases the crystallization onset temperature of the heat storage material composition containing the sugar alcohol and stabilizes the supercooled state of the heat storage material composition containing the sugar alcohol.

Example 1

To a 9 cc glass sample jar, 8.55 g of erythritol and 0.44 g of sodium acetate were added. A pair of silver electrodes (line diameter: 1.5 mm) having a wire shape was immersed in the mixture of erythritol and sodium acetate by about 10 mm. The distance between the pair of silver electrodes was about 3 to 5 mm. Thus, a heat storage device of Example 1 was made. Then erythritol was completely melted in an atmosphere at 129° C. The temperature of the mixture in the sample jar was decreased to 84° C. At this stage, the mixture in the sample jar maintained the liquid state and was in a supercooled state. Next, 2 V voltage was applied by connecting the pair of silver electrodes to a DC power source. Generation of crystal nuclei in the sample jar was visually confirmed 120 seconds after voltage application to the pair of silver electrodes started. Then voltage application to the pair of silver was stopped and erythritol was further completely melted in an atmosphere at 129° C. The temperature of mixture in the sample jar was then decreased to 79° C. The mixture in the sample jar at this stage maintained a liquid state and was in a supercooled state. The pair of silver electrodes was then connected to a DC power source and voltage of 2 V was applied. Generation of nuclei of erythritol crystals in the sample jar was visually confirmed 46 seconds after application of voltage to the pair of silver electrode started.

Example 2

To a 9 cc glass sample jar, 8.51 g of erythritol and 0.26 g of potassium acetate were added. A pair of silver electrodes (line diameter: 1.5 mm) having a wire shape was immersed in the mixture of erythritol and potassium acetate by about 10 mm. The distance between the pair of silver electrodes was about 3 to 5 mm. Thus, a heat storage device of Example 2 was made. Then erythritol was completely melted in an atmosphere at 129° C. The temperature of the mixture in the sample jar was decreased to 74° C. At this stage, the mixture in the sample jar maintained the liquid state and was in a supercooled state. Next, 2 V voltage was applied by connecting the pair of silver electrodes to a DC power source. Generation of nuclei of erythritol crystals in the sample jar was visually confirmed 81 seconds after voltage application to the pair of silver electrodes started.

Example 3

To a 9 cc glass sample jar, 8.02 g of erythritol and 0.22 g of sodium chloride were added. A pair of silver electrodes (line diameter: 1.5 mm) having a wire shape was immersed in the mixture of erythritol and sodium chloride by about 10 mm. The distance between the pair of silver electrodes was about 3 to 5 mm. Thus, a heat storage device of Example 3 was made. Then erythritol was completely melted in an atmosphere at 129° C. The temperature of the mixture in the sample jar was decreased to 79° C. At this stage, the mixture in the sample jar maintained the liquid state and was in a supercooled state. Next, 2 V voltage was applied by connecting the pair of silver electrodes to a DC power source. Generation of nuclei of erythritol crystals in the sample jar was visually confirmed 33 seconds after voltage application to the pair of silver electrodes started. Then voltage application to the pair of silver was stopped and erythritol was further completely melted in an atmosphere at 129° C. The temperature of mixture in the sample jar was then decreased to 69° C. The mixture in the sample jar at this stage maintained a liquid state and was in a supercooled state. The pair of silver electrodes was then connected to a DC power source and voltage of 2 V was applied. Generation of nuclei of erythritol crystals was visually confirmed 14 seconds after application of voltage to the pair of silver electrode started.

Example 4

To a 9 cc glass sample jar, 8.38 g of erythritol and 0.23 g of calcium chloride were added. A pair of silver electrodes (line diameter: 1.5 mm) having a wire shape was immersed in the mixture of erythritol and calcium chloride by about 10 mm. The distance between the pair of silver electrodes was about 3 to 5 mm. Thus, a heat storage device of Example 4 was made. Then erythritol was completely melted in an atmosphere at 129° C. The temperature of the mixture in the sample jar was decreased to 74° C. At this stage, the mixture in the sample jar maintained the liquid state and was in a supercooled state. Next, 2 V voltage was applied by connecting the pair of silver electrodes to a DC power source. Generation of nuclei of erythritol crystals in the sample jar was visually confirmed 22 seconds after voltage application to the pair of silver electrodes started.

Example 5

To a 9 cc glass sample jar, 8.33 g of erythritol and 0.25 g of sodium hydroxide were added. A pair of silver electrodes (line diameter: 1.5 mm) having a wire shape was immersed in the mixture of erythritol and sodium hydroxide by about 10 mm. The distance between the pair of silver electrodes was about 3 to 5 mm. Thus, a heat storage device of Example 5 was made. Then erythritol was completely melted in an atmosphere at 129° C. The temperature of the mixture in the sample jar was decreased to 74° C. At this stage, the mixture in the sample jar maintained the liquid state and was in a supercooled state. Next, 2 V voltage was applied by connecting the pair of silver electrodes to a DC power source. Generation of nuclei of erythritol crystals in the sample jar was visually confirmed 62 seconds after voltage application to the pair of silver electrodes started. Then voltage application to the pair of silver was stopped and erythritol was further completely melted in an atmosphere at 129° C. The temperature of mixture in the sample jar was then decreased to 69° C. The mixture in the sample jar at this stage maintained a liquid state and was in a supercooled state. The pair of silver electrodes was then connected to a DC power source and voltage of 1.8 V was applied. Generation of nuclei of erythritol crystals was visually confirmed 11 seconds after application of voltage to the pair of silver electrode started.

Example 6

To a 9 cc glass sample jar, 8.16 g of erythritol and 0.04 g of silver nitrate were added. A pair of carbon electrodes (line diameter: 2.0 mm) having a wire shape was immersed in the mixture of erythritol and silver nitrate by about 10 mm. The distance between the pair of carbon electrodes was about 3 to 5 mm. Thus, a heat storage device of Example 6 was made. Then erythritol was completely melted in an atmosphere at 129° C. The temperature of the mixture in the sample jar was decreased to 79° C. At this stage, the mixture in the sample jar maintained the liquid state and was in a supercooled state. Next, 2 V voltage was applied by connecting the pair of carbon electrodes to a DC power source. Generation of nuclei of erythritol crystals in the sample jar was visually confirmed 81 seconds after voltage application to the pair of carbon electrodes started.

Example 7

To a 6 cc glass sample jar, 5.5 g of erythritol and 0.14 g of sodium hydrogencarbonate were added. A pair of silver electrodes (line diameter: 1.5 mm) having a wire shape was immersed in the mixture of erythritol and sodium hydrogencarbonate by about 5 mm. The distance between the pair of silver electrodes was about 3 to 5 mm. Thus, a heat storage device of Example 7 was made. Then erythritol was completely melted in an atmosphere at 129° C. The temperature of the mixture in the sample jar was decreased to 64° C. At this stage, the mixture in the sample jar maintained the liquid state and was in a supercooled state. Next, AC voltage (peak-to-peak amplitude: 6 Vpp, frequency: 0.1 Hz) was applied for 2 minutes by connecting the pair of silver electrodes to an AC power source. Generation of nuclei of erythritol crystals in the sample jar was visually confirmed.

Comparative Example 1

To a 9 cc glass sample jar, 9.25 g of erythritol was added. A pair of silver electrodes (line diameter: 1.5 mm) having a wire shape was immersed in erythritol by about 10 mm. The distance between the pair of silver electrodes was about 3 to 5 mm. Thus, a heat storage device of Comparative Example 1 was made. Then erythritol was completely melted in an atmosphere at 129° C. The temperature of erythritol in the sample jar was decreased to 79° C. At this stage, erythritol in the sample jar maintained the liquid state and was in a supercooled state. Next, 2 V voltage was applied for 2 minutes by connecting the pair of silver electrodes to a DC power source but generation of nuclei of erythritol crystals in the sample jar was not confirmed. Voltage of 3 V was applied for 2 minutes but generation of nuclei of erythritol crystals was not confirmed.

Comparative Example 2

To a 9 cc glass sample jar, 8.38 g of erythritol and 0.38 g of sodium acetate were added. A pair of copper electrodes (line diameter: 1.5 mm) having a wire shape was immersed in the mixture of erythritol and sodium acetate by about 10 mm. The distance between the pair of copper electrodes was about 3 to 5 mm. Thus, a heat storage device of Comparative Example 2 was made. Then erythritol was completely melted in an atmosphere at 129° C. The temperature of the mixture in the sample jar was decreased to 79° C. At this stage, the mixture in the sample jar maintained the liquid state and was in a supercooled state. Next, 2 V voltage was applied for 2 minutes by connecting the pair of copper electrodes to a DC power source. Generation of nuclei of erythritol crystals in the sample jar was not confirmed. The temperature of the mixture in the sample jar was decreased to 69° C. At this stage, the mixture in the sample jar maintained the liquid state and was in a supercooled state. The pair of copper electrodes was connected to a DC power source and voltage of 2 V was applied for 2 minutes. However, generation of nuclei of erythritol crystals in the sample jar was not confirmed.

Comparative Example 3

To a 9 cc glass sample jar, 8.38 g of erythritol and 0.03 g of copper acetate were added. A pair of silver electrodes (line diameter: 1.5 mm) having a wire shape was immersed in the mixture of erythritol and copper acetate by about 10 mm. The distance between the pair of silver electrodes was about 3 to 5 mm. Thus, a heat storage device of Comparative Example 3 was made. The solubility of copper acetate in 100 mL of 20° C. water is 7.2 g. Then erythritol was completely melted in an atmosphere at 129° C. The temperature of the mixture in the sample jar was decreased to 79° C. At this stage, the mixture in the sample jar maintained the liquid state and was in a supercooled state. Next, 2 V voltage was applied for 2 minutes by connecting the pair of silver electrodes to a DC power source. Generation of nuclei of erythritol crystals in the sample jar was not confirmed. Then voltage of 2.5 V was applied to the pair of silver electrodes for 2 minutes while maintaining the temperature of the mixture inside the sample jar to 79° C. However, generation of nuclei of erythritol crystals in the sample jar was not confirmed.

Comparative Example 4

To a 9 cc glass sample jar, 8.31 g of erythritol and 0.32 g of silver chloride were added. A pair of silver electrodes (line diameter: 1.5 mm) having a wire shape was immersed in the mixture of erythritol and silver chloride by about 10 mm. The distance between the pair of silver electrodes was about 3 to 5 mm. Thus, a heat storage device of Comparative Example 4 was made. The solubility of silver chloride in 100 mL of 20° C. water is 0.2 mg or less. Then erythritol was completely melted in an atmosphere at 129° C. The temperature of the mixture in the sample jar was decreased to 79° C. At this stage, the mixture in the sample jar maintained the liquid state and was in a supercooled state. Next, 2 V voltage was applied for 2 minutes by connecting the pair of silver electrodes to a DC power source. Generation of nuclei of erythritol crystals in the sample jar was not confirmed.

A heat storage material composition according to an embodiment of the present disclosure can be used in various heat storage devices and systems. A heat storage material composition according to an embodiment of the present disclosure can stably maintain a supercooled state particularly in an environment of 25° C. to 60° C. and thus may be used in heat storage devices that use, as a heat source, waste heat of an automobile internal combustion engine or a boiler, for example.

What is claimed is:

1. A heat storage material composition comprising:
   a sugar alcohol; and
   a stabilizer that allows the sugar alcohol to maintain a liquid state and a supercooled state, the stabilizer being
   a salt that has a solubility of 9 g or more in 100 mL of 20° C. water and gives a monovalent anion, the salt being one selected from the group consisting of a carboxylate, calcium chloride, sodium acetate, a hydroxide, a nitrate, a hydrogencarbonate, and a benzoate.

2. The heat storage material composition according to claim 1, wherein the hydroxide is sodium hydroxide.

3. The heat storage material composition according to claim 1, wherein the nitrate is sodium nitrate or silver nitrate.

4. The heat storage material composition according to claim 1, wherein the hydrogencarbonate is sodium hydrogencarbonate.

5. The heat storage material composition according to claim 1, wherein the benzoate is sodium benzoate or potassium benzoate.

6. The heat storage material composition according to claim 1, wherein the sugar alcohol is erythritol.

7. A heat storage device comprising:
   the heat storage material composition according to claim 1; and
   a pair of electrodes arranged to be in contact with the heat storage material composition,
   wherein at least one of the pair of electrodes contains silver or a silver compound or the heat storage material composition contains a silver ion when in a liquid state, and
   when the heat storage material composition is in a liquid state and in a supercooled state, voltage is applied between the pair of electrodes so as to release the supercooled state of the heat storage material composition.

8. A heat storage method comprising:
   increasing a temperature of the heat storage material composition according to claim 1 to a temperature equal to or higher than a melting point of the sugar alcohol so as to melt the sugar alcohol in a solid state;
   maintaining the temperature of the heat storage material composition to a temperature lower than the melting point of the sugar alcohol and maintaining the heat storage material composition in a supercooled state;
   solidifying the sugar alcohol; and
   recovering at least part of heat released from the heat storage material composition as a result of solidification of the sugar alcohol.

9. The heat storage material composition according to claim 1, wherein $0.10 \leq Ws/Wa \leq 0.3$, where Ws is a mass of the stabilizer contained in the heat storage material composition, and Wa is a mass of the sugar alcohol contained in the heat storage material composition.

10. The heat storage material composition according to claim 1, wherein the salt is one selected from the group consisting of a sodium acetate, an ammonium acetate, a potassium acetate, a sodium hydroxide, a calcium chloride, a sodium nitrate, a silver nitrate, a sodium benzoate, and a potassium benzoate.

* * * * *